Nov. 18, 1969    W. L. TAYLOR    3,478,960

HEATING-COOLING VORTEX CONTROL VALVE

Filed June 10, 1968    2 Sheets-Sheet 1

Inventor
Wesley L. Taylor
By Hume, Clement, Hume & Lee
Attorneys

United States Patent Office 3,478,960
Patented Nov. 18, 1969

3,478,960
HEATING-COOLING VORTEX CONTROL VALVE
Wesley L. Taylor, Glenview, Ill., assignor to Power Regulator Company, Skokie, Ill., a corporation of Delaware
Filed June 10, 1968, Ser. No. 735,874
Int. Cl. G05d 23/00; F15c 1/16
U.S. Cl. 236—1    9 Claims

ABSTRACT OF THE DISCLOSURE

A control device for a heating-cooling system includes a fluid amplifier and a thermostatic valve to regulate the flow rate of either hot or cold fluid so that a preselected temperature setting is established and maintained. A portion of the circulating fluid is shunted to the control inlet of the fluid amplifier by way of thermostatic valve to modulate the primary flow through the amplifier and to totally preclude such flow when the desired temperature is attained. A preferred thermostatic valve construction which automatically reverses its flow control characteristics with a change of the system from a heating to a cooling mode or vice versa is also disclosed.

INTRODUCTION

The present invention relates generally to heating and cooling systems of the type utilizing circulating fluids and, more particularly, to new and improved control apparatus for modulating and precluding such fluid flow in accordance with a preselected temperature setting.

SUMMARY OF THE INVENTION

It is an object of the present invention to provide new and improved control apparatus for regulating the flow rate of a heating or cooling fluid of an air-conditioning system or the like.

It is another object of the present invention to provide control apparatus in which a control inlet of a fluid amplifier provides a flow signal for modulating or totally precluding primary fluid flow through the amplifier in accordance with a sensed temperature condition.

It is another object of the present invention to provide a new and improved thermostatic valve construction of the type which automatically reverses its operating characteristics in response to a change in the heat exchange fluid from hot to cold or vice versa.

Accordingly, an air-conditioning system of the type selectively utilizing a circulating hot and cold fluid to provide respectively a heating and a cooling effect is provided with control apparatus for regulating the flow rate of the circulated fluid to maintain a preselected temperature condition. Specifically, the control apparatus comprises a fluid amplifier including a primary inlet, an outlet and a control inlet for modulating fluid flow between the primary inlet and the outlet in accordance with flow pressure at the control inlet and for precluding fluid flow between the primary inlet and the outlet when flow pressure at the control inlet exceeds a predetermined valve. Means are provided for coupling the primary inlet and the outlet of the fliud amplifier in series with the flow path of the circulating fluid and a control fluid flow conduit is provided for shunting a portion of the circulating fluid to the control inlet of the fluid amplifier. Thermostatic valve means, inserted along the control conduit, are provided for regulating the fluid flow to the control inlet in accordance with a sensed temperature condition.

BRIEF DESCRIPTION OF THE DRAWINGS

The features of the present invention which are believed to be novel are set forth with particularity in the appended claims. The invention together with further objects and advantages thereof may best be understood, however, with reference to the following description taken in connection with the accompanying drawings in the several figures of which like reference numerals identify like elements and in which:

DESCRIPTION OF THE PREFERRED EMBODIMENTS

Figure 1:
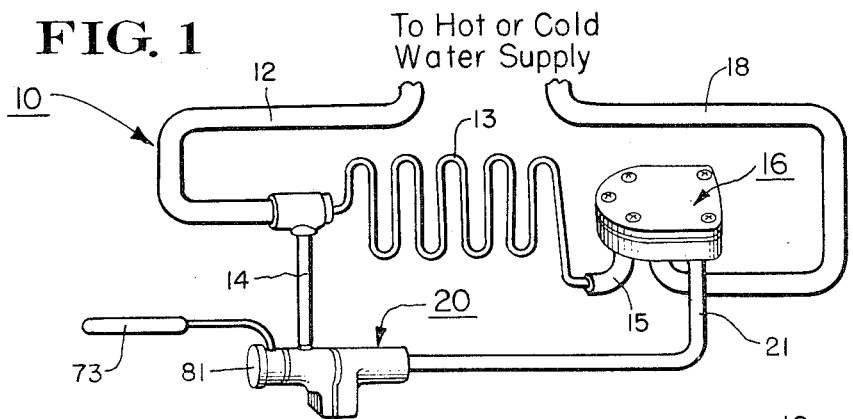
FIGURE 1 is a schematic representation of an air-conditioning system embodying the present invention.

Referring to FIGURE 1, an air-conditioning system, generally designated by the reference numeral 10, comprises an inlet pipe 12 to which there is selectively supplied a preheated or a precooled fluid, such as water, under a predetermined pressure from an appropriate source (not shown). The inlet pipe 12 is connected to one end of a fan coil 13 of a conventional fan coil unit (not shown) and to a control or by-pass conduit 14. The remaining end of fan coil 13 is connected by a pipe 15 to a primary inlet of a fluid amplifier 16. An outlet of fluid amplifier 16 is returned to the supply source by a pipe 18 to thereby complete the primary flow path of the circulating fluid.

The fluid flow rate through fan coil 13 and thus the net heating or cooling energy exchanged by the fan coil unit is regulated in accordance with the fluid flow pressure provided at a control inlet of the fluid amplifier 16. A predetermined small portion of the circulating fluid is shunted to the control inlet of the fluid amplifier 16 through a by-pass conduit 14, a thermostatic valve 20 and a remaining connector section 21 of the by-pass conduit which extends between the output of the thermostatic valve and the control inlet of the fluid amplifier.

Figure 2:
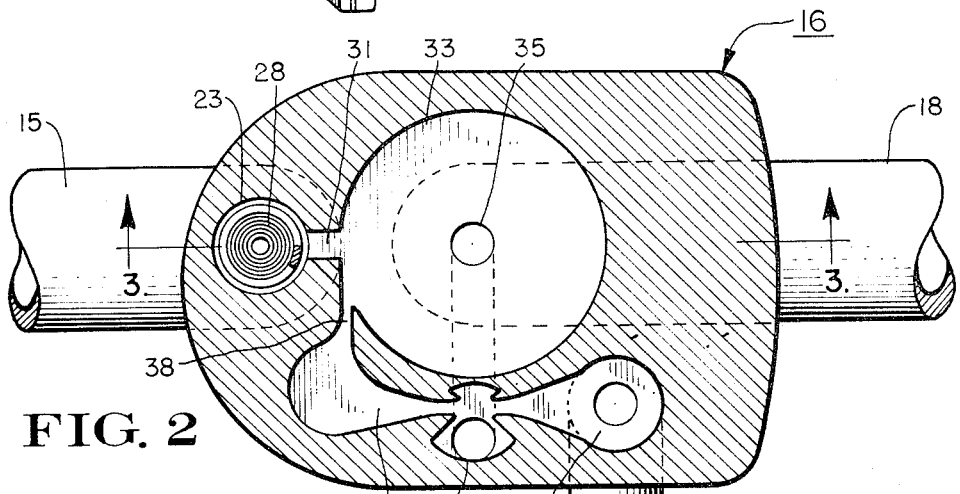
FIGURE 2 is a sectional plan view of the fluid amplifier of FIGURE 1.
Figure 3:
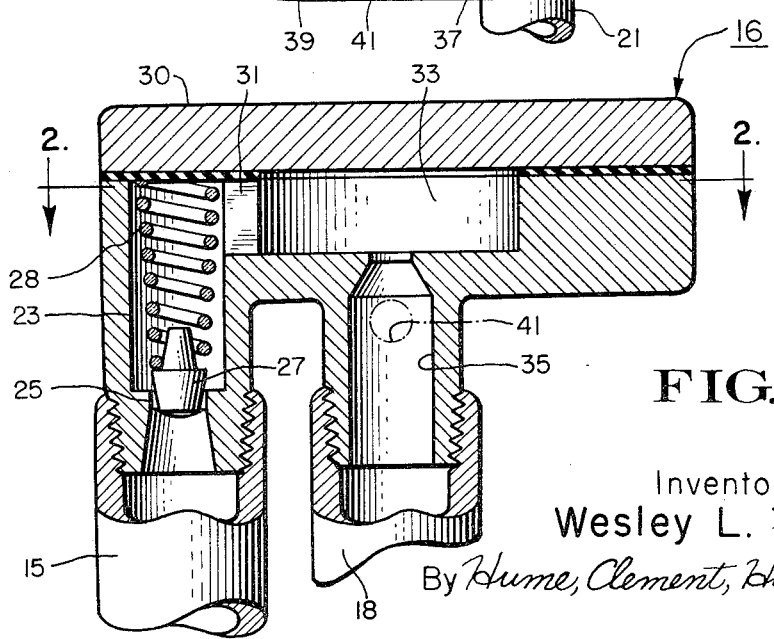
FIGURE 3 is a side-view of the fluid amplifier taken along line 3—3 of FIGURE 2.

The construction of the fluid amplifier 16 according to the present invention is illustrated in FIGURES 2 and 3. Specifically, the primary flow pipe 15 is coupled to a vertically directed primary inlet passage 23 by a threaded connection to a lower housing section of the fluid amplifier. For reasons to be explained, the primary inlet 23 is provided with a check valve comprising a cylindrical valve seat 25 integral with the cylindrical side walls of the inlet passage 23 and a movable valve member 27 which is normally biased against valve seat 25 by a tapered helical spring 28 which is compressably seated between a top wall 30 of the fluid amplifier and a circumferential shoulder of valve member 27. The spring 28 yields under a modest flow pressure, for example two pounds per square inch, to admit fluid flow into the inlet passage 23.

A singular exit duct 31 extends radially outward from the central axis of the elongated inlet passage 23. The exit passage 31 directs fluid flow radially into an enlarged cylindrical vortex or swirl chamber 33. The swirl chamber 33 is provided with a central outlet 35 which extends below the chamber along the central axis thereof into threaded engagement with return pipe 18.

A conically flared vertical passageway 37 extends from a control inlet pipe section 21 to communicate with the swirl chamber 33 along a narrowed control inlet 38 which opens tangentially into the swirl chamber adjacent and perpendicular to the axis of exit passage 31. Passageway 37 communicates with the control inlet 38 through a conventional Venturi section 39 which includes a narrowed intermediate throat portion vented by a conduit 41 to the central discharge outlet 35 of the fluid amplifier. The Venturi section 38 isolates the control inlet passage 37 from relatively high rim back pressures which are developed in swirl chamber 33.

The operation of the vortex type fluid amplifier 16 per se is generally conventional. Specifically, fluid entering the primary inlet 23 is confined to flow radially out of the inlet through the exit duct 31. In the absence of signal pressures at the tangential control inlet 38, the radial flow at exit duct 31 continues substantially unimpeded and in a straight line to exit from the amplifier through the central outlet 35.

Assuming now a control fluid flow, such fluid in pipe 21 enters the flared passageway 37 and thence through the Venturi coupling section 39 to the tangential control inlet 38. Fluid existing from control inlet 38 is prependicular to the direction of the primary fluid flow and by momentum exchange principles now well understood with regard to fluid amplifiers of the vortex type here illustrated, the primary flow out of exit duct 31 is deflected to the rim of the swirl chamber 33 and commences a clockwise rotation thereabout. The clockwise circulation of the fluid creates a pressure against the peripheral rim of the swirl chamber 33 which is proportional to the pressure of the signal at the control inlet 38. Vortex amplifier 16 provides a gain in the range of from 8 to 12, that is, a given incremental change in fluid flow in control inlet 38 provides a proportional change of from 8 to 12 times that volume in the flow emerging from exit duct 31.

Furthermore, it has been found that if the fluid pressure at control inlet 38 is slightly higher than the pressure of the fluid exiting at duct 31, then there is created a sufficient rim or back pressure to preclude entry of further fluid into the swirl chamber and thus, primary fluid flow between the inlet and the outlet passages is totally precluded. This excess control pressure potential is assured in the present embodiment by the provision of means for effectively increasing the nominal fluid flow pressure at the control inlet 38 relative to that at the primary inlet 23. Specifically, this means is the previously described check valve which reduces an approximately ten pound per square inch supply pressure to an approximately eight pound per square inch pressure within the primary flow inlet 23. Of course, the flow volume and pressure at the control inlet 38 is regulated between the aforesaid maximum value and zero by the thermostatic valve now to be considered.

Figure 4:
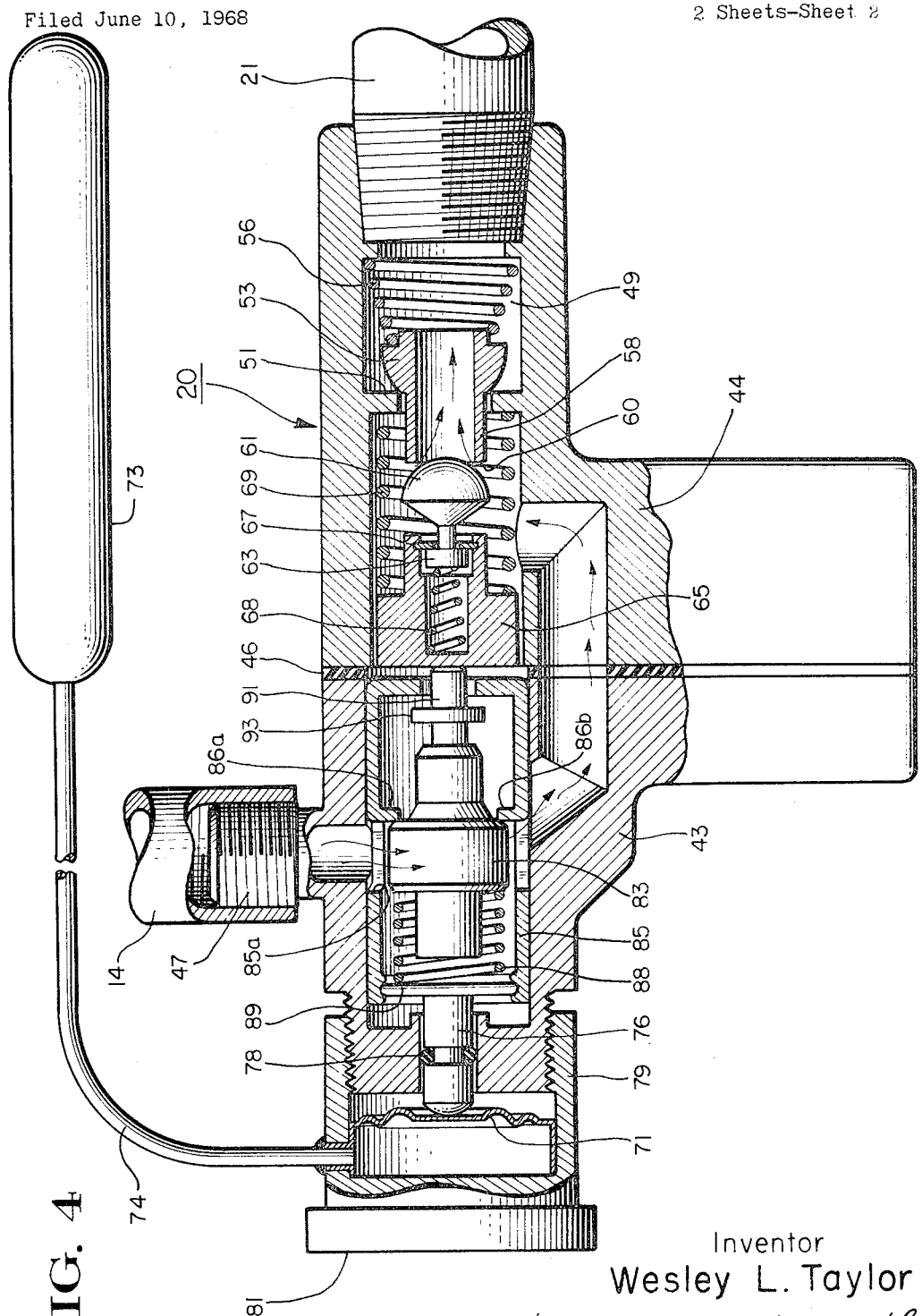
FIGURE 4 is a cross-sectional view of the thermostatic valve of FIGURE 1.

The thermostatic valve 20 of the present system is illustrated in deail in FIGURE 4. The valve 20 comprises a bipartite housing comprising generally cylindrical housing sections 43 and 44, respectively, the abutting faces of the sections being sealed by an intermediate gasket 46. The housing section 43 is provided with a fluid inlet 47 in its upper surface which inlet is threadably connected to the by-pass conduit 14. A fluid outlet 49 is provided at one end of housing section 44 with an internally threaded end portion thereof threadably engaging conduit section 21.

The housing sections 43 and 44 have axially aligned elongated cylindrical central passageways which are aligned with the outlet 49 and are transverse to the inlet 47. Within the aligned housing passages, there are provided valve means for continually adjusting the flow rate to outlet pipe 21 and thus to the control inlet of the fluid amplifier in accordance with a sensed temperature condition. Specifically, there is provided a first valve means comprising an annular valve seat 51 integral with the interior surface of housing section 44 and positioned immediately upstream of the outlet 49. A first valve member 53 has an elongated central portion which projects through the circular valve port defined by the valve seat 51 and a flared rear portion which is normally maintained in sealed engagement with the valve seat by a tapered helical spring 56. Spring 56 is compressively retained between a flange on the back wall of the outlet 49 and a circumferential shoulder portion on the back side of the valve member 53.

The first valve member 53 is in turn provided with a central flow port or passage 58 having adjacent its forward end a valve seat 60 defined by the circular walls of the valve member. A second valve member 61 is of a hemispherical configuration and, as will be explained, this valve is moveable axially between positions in which valve port 58 is fully open and fully closed. The hemispherical valve 61 is provided with a short stem having an enlarged integral head portion 63. The cylindrical head portion 63 is loosely journaled in a central passage of an enlarged annular bearing block 65 which is slidably moveable in the central guide passage of the housing. The enlarged cylindrical head 63 of the valve is normally biased against an annular stop washer 67 by a spring 68 but is moveable against the normal bias of this spring to a leftmost position abutting an annular stepped shoulder portion within the passage.

The bearing block 65 which is normally biased to the left by a helical spring 69 inserted between one side of valve seat 51 and the block 65 is part of an adjustable length valve stem which is moveable in response to expansion and contraction of a sealed diaphragm 71. The diaphragm 71 forms a part of a conventional thermostatic transducer which further includes a bulb element 73 positioned in the return air duct of the fan coil unit to sense ambient room temperature. The bulb 73 is coupled to the diaphragm 71 by a capillary 74.

The diaphragm 71 directly imparts movement to a terminal post 76 of the adjustable length of valve stem. To this end, the post 76 is journaled in the end wall of the casing section 43 with the terminus of the post positioned to contact the center of the diaphragm 71. A sliding seal is maintained between the post 76 and its bearing by a conventional O-ring 78. The diaphragm 71 is carried at the base of a cylindrical casing 79 which threadably engages the end portion of the housing section 43. Upon rotation of a temperature control knob 81 the casing 79 and the diaphragm 71 therein are shifted relative to the housing section 43 and the adjustable length valve stem therein.

The adjustable length valve stem further includes a second thermostatic means intermediate the post 76 and the bearing block 65 which is responsive to a change in the operational mode of the air-conditioning system, namely a change in the circulating fluid from hot to cold or vice versa, to effect a reversal in the operational characteristics of the valve. Specifically, this section of the valve stem includes a second thermostatic power element 83 supported within a cylindrical cage 85 which in turn slidably rides in the central guide passage of the housing section 43. The cage 85 is slotted as at 85a and 85b to permit fluid flow therethrough as schematically indicated by the arrows in the drawing. The power element 83 is yieldably biased against a plurality of struck-out tabs 86a and 86b of the cage 85 by a helical spring 88 which is seated at its opposite end against a transverse closure plate 89 of the cage. The plate 89 is integral with the terminal post 76.

The opposite end of power element 83 includes a slidable power stem 91 which extends through an aperture end wall of the cage 85 to abut the back side of bearing block 65. The power stem 91 carries a collar 93 which is somewhat larger than the aperture in the end wall of the cage 85. The power element 83 is itself well known in the art and includes within its casing an organic compound or the like which substantially alters its volume in response to a material temperature change. The power element 83 illustrated is of the type in which the power stem 91 is driven outwardly in response to a material increase in the temperature or the fluid surrounding the element 83 and is retracted in response to a decrease in temperature of similar magnitude.

In explaining the operation of the thermostatic valve 20, it will be initially assumed that cold water in the range of 40° to 50° Fahrenheit is directed into the inlet 47 in which case the power stem 91 is in a retracted state and hemispherical valve 61 is conditioned for movement relative to its valve seat 60. It is further assumed that the temperature selector knob 81 has been set to a desired temperature so as to establish an initial position for the hemispherical valve 61 which permits a partially restricted flow into the valve port 58 as illustrated. Under these conditions, a rise in room temperature as sensed by bulb 73 expands diaphragm 71 to shift the abutting terminal post 76 to the right. This movement is translated through the various elements of the valve stem to provide an identical rightward movement of the hemispherical valve member 61 to further constrict fluid flow into valve port 58. Continued expansion of diaphragm 71 ultimately causes valve member 61 to engage the valve seat 60 and close the port. Further expansion of the diaphragm is absorbed by compression of the spring 68 within the limited tolerance range of movement of the cylindrical head portion 63. Of course, a reduction in room temperature as sensed by bulb element 73 results in a contraction of the diaphragm and a leftward shifting of the valve mechanism to further open the valve port 58 and permit an increased flow therethrough.

Assuming now that the operational mode of the air-conditioning system is changed from one of cooling to one of heating, the fluid entering inlet 47 is now in the temperature range of from 100°–210° Fahrenheit. This extreme temperature change is sensed by the power element 83 and causes stem 91 to be extended therefrom until the collar portion 93 abuts the end wall of the cage 85. Any overtravel of the power stem 91 is absorbed by compression of spring 88. Under these conditions, the valve stem is sufficiently lengthened so that the valve member 61 is positioned in firm engagement with its valve seat 60 and the first valve member 53 is now conditioned for movement between a closed position to a fully open position upon rightward movement of the composite valve stem. Specifically, an increase in room temperature above that set at the adjustable selector knob 81 results in expansion of the diaphragm 71 which is directly translated to the composite valve stem apparatus to cause a corresponding movement of the first valve member 53 to the right against the bias of spring 56 and thereby permit proportional flow to enter the outlet passage 49. It will be recognized that operation of the valving mechanism in the heating mode is directly contra to that in the cooling mode; an increase in temperature now results in an increased flow to the outlet 49. Likewise, a decrease in temperature below that selected shifts the valve stem to the left and effects a corresponding reduction of flow to the outlet, rather than an increase as was the case for the cooling mode of operation.

The overall operation of the system of the present invention can best be appreciated by referring again to FIGURE 1. Assuming initially that cold water in the range of 40–50° Fahrenheit is pumped into the inlet pipe 12 under ten pounds per square inch pressure from a suitable conventional supply (not shown), this fluid flow is apportioned between the primary flow path of fan coil 13 and the by-pass or control conduit 14. The volume of flow through fan coil 13 to the return pipe 18, and thus the cooling capacity of the fan coil unit, is a function of the flow impedance of the fluid amplifier 16. The fluid amplifier is effective to modulate the volume of flow between the inlet pipe 15 and the outlet pipe 18 in accordance with a flow volume provided through control inlet pipe 21.

It is essential in a fan coil unit that some means be provided to fully shut off the primary fluid flow when the desired temperature is attained otherwise if the ambient energy losses are less than the energy provided by the continually circulating fluid, the temperature of the room will continue to rise without control. In this regard, the present invention provides an extremely simple and reliable means for fully shutting down the primary fluid flow through fan coil 13. Specifically, and as earlier mentioned, it has been found that the vortex type fluid amplifier 16 is capable of providing the desired shut-off characteristic if the fluid pressure at the control inlet 38 exceeds the pressure at the primary inlet 23 by a given value. This result is attained in the present embodiment by introducing a pressure loss in the primary flow path which is not experienced in the control fluid flow path. Specifically, the check valve 27 at the entry of the primary inlet 23 introduces approximately a two pound per square inch pressure loss which provides an adequate pressure differential between the control inlet and the primary inlet to permit full shut-off. Thus, when the desired room temperature is attained under either a heating or cooling mode of operation, a maximum fluid flow is provided in control conduit 21 to shut-off the main flow through fan coil 13 thereby inhibiting further effective operation of the fan coil unit.

Assuming now that in the cooling mode it is desired to further reduce room temperature below an established quiescent value, the temperature selector knob 81 is turned clockwise to urge the diaphragm 71 and the composite valve stem to the right to further interfere with flow through the valve port 58. This action effects a corresponding reduction in the flow volume at tangential control inlet 38 of the fluid amplifier thereby permitting the primary fluid to more easily and directly flow to the axial outlet passage 35 of the swirl chamber 33. This reduction in flow impedance, of course, permits a greater flow through fan coil 13 and thus permits a further cooling of the room. The attendant decrease in room temperature is sensed by the thermostatic element 73 and causes the diaphragm 71 to contract and the valve member 61 to move further away from its valve seat 60. Eventually, the valve member 61 moves back sufficiently that flow into valve passage 58 is substantially unimpeded and a maximum control fluid flow is provided at the tangential control inlet 38 of the fluid amplifier 16. The rim back pressure created by this maximum control fluid flow, in conjunction with the resistance to flow provided by the check valve 27, results in the check valve fully closing to preclude further flow into the primary inlet of the fluid amplifier. The check valve remains closed until the ambient room temperature rises above that set at the selector 81 at which time the valve member 61 of the thermostatic valve 20 tends to close its associated valve port and thereby ultimately increasing flow through fan coil 13.

A change in the operational mode of the air-conditioning system of the invention is simply accomplished by substituting a hot water supply for the prior cold water supply. The operation of the system in the heating mode is substantially identical to that previously described except for the internal operation of the thermostatic valve 20. The valve 20, as earlier discussed, senses the change in operational mode of the system and automatically reverses its response characteristics to provide proper control fluid flow under these new conditions. Specifically, the hot water directed into inlet 47 of the thermostatic valve causes an increase in the length of the composite valve stem to thereby firmly seat valve member 61 in its valve seat 60 and to condition the valve 53 for movement under the expansion of diaphragm 71. Thus, if temperature selector 81 is set to a temperature substantially in excess of a previously established ambient, the valve member 53 is initially closed to permit a maximum flow through fan coil 13. As the room temperature increases, the bulb 73 is heated to expand the diaphragm 71 and drive the composite valve stem further to the right to move valve 53 away from its seat 51 and permit fluid flow into the outlet 49. This control fluid flow operates through tangential control inlet 38 to angularly deflect fluid flow out of the main duct 31 and develop a rim back pressure which impedes further primary fluid flow into the chamber. A continued increase in room temperature proportionally increases the flow at control passage 38 until the back pressure is sufficient to close the check valve 27 at which time flow through fan coil 13 is halted and the desired room temperature attained.

While particular embodiments of the present invention have been shown and described, it is apparent that various changes and modifications may be made, and it is therefore intended in the following claims to cover all such modifications and changes as may fall within the true spirit and scope of this invention.

What is claimed is:

1. In an air-conditioning system of the type selectively utilizing a circulating hot and cold fluid to provide respectively a heating and a cooling effect, control apparatus for regulating the flow rate of said fluid to maintain a pre-selected temperature condition comprising:

a fluid amplifier, including a primary inlet, an outlet and a control inlet, for modulating fluid flow between said inlet and outlet in accordance with a flow pressure at said control inlet and for substantially precluding fluid flow between said inlet and outlet when said pressure at said control inlet exceeds a predetermined value;

means coupling said inlet and outlet of said fluid amplifier in series with the flow path of said circulating fluid;

a control fluid flow conduit for coupling a predetermined small portion of said circulating fluid to said control inlet of said fluid amplifier;

thermostatic valve means, inserted along said control conduit for regulating the fluid flow to said control inlet in accordance with a sensed temperature condition;

and means effectively increasing the nomial fluid flow pressure at said control inlet relative to that at said primary inlet for providing a maximum flow pressure at said control inlet which exceeds the flow pressure at said primary inlet by a predetermined value.

2. The combination according to claim 1 in which said fluid amplifier is of the vortex type and comprises a cylindrical swirl chamber having an outlet along its central axis, a radially directed peripheral inlet and a tangential control inlet.

3. The combination according to claim 2 and including Venturi flow passage means, vented to said outlet of said fluid amplifier, positioned immediately upstream of said control inlet of said fluid amplifier for effectively isolating said thermostatic valve means from fluid back pressures developed in said swirl chamber.

4. The combination according to claim 3 in which said effective pressure increasing means consists of a spring loaded check valve, positioned immediately upstream of said primary inlet of said fluid amplifier, for reducing the flow pressure at said primary inlet by a predetermined amount.

5. In an air-conditioning system of the type selectively utilizing a circulating hot and cold fluid to provide respectively a heating and a cooling effect, a thermostatic valve for regulating the flow rate of said circulating fluid to maintain a constant preselected temperature in both the heating and cooling operational modes of said system comprising:

a valve housing having an inlet and an outlet;

first valve means, positioned within said housing, comprising a first valve seat defining a central port and a first valve member cooperating with said seat for controlling fluid flow through said central port, said valve member having in turn a central flow port and a valve seat adjacent one end of said central port;

a second valve member within said housing and cooperating with said seat on said first valve member to control fluid flow through said central port of said first valve member;

first thermostatic means responsive to external temperature for operating one of said valve members to open and close its associated port;

and a second thermostatic means responsive to a material change in the temperature of the fluid passing through said housing for causing said one valve member to close its associated port and for rendering said first thermostatic means effective to operate the remaining valve member to open and close its associated port.

6. The combination according to claim 5 in which said first valve member is spring biased into engagement with said first valve seat to normally maintain said first valve port in a closed condition.

7. The combination according to claim 6 and including valve stem means coupled to said first thermostatic means for moving said second valve member between positions in which said central port of said first valve member is respectively opened and closed and in which said second thermostatic means is effective to lengthen said stem means to close said central port on said first valve member and to condition said first valve member for movement between open and closed positions under the influence of said first thermostatic means.

8. In a system for regulating the rate of fluid flow from a supply source to a receiving station the combination comprising:

a fluid amplifier, including a primary inlet, an outlet and a control inlet, for modulating fluid flow between said inlet and outlet in accordance with a flow pressure at said control inlet and for substantially precluding fluid flow between said inlet and outlet when said pressure at said control inlet exceeds a predetermined value;

means coupling said inlet and outlet of said fluid amplifier in series with the flow path of said fluid between said supply source and said receiving station;

a control fluid flow conduit for coupling a predetermined small portion of said supply fluid flow to said control inlet of said fluid amplifier;

and control means for modulating the fluid flow to said control inlet according to a predetermined control condition.

9. The combination according to claim 8 and including means effectively increasing the nominal fluid flow pressure at said control inlet relative to that at said primary inlet for providing a maximum flow pressure at said control inlet which exceeds the flow pressure at said primary inlet by a predetermined value.

References Cited
UNITED STATES PATENTS

| | | |
|---|---|---|
| 2,495,226 | 1/1950 | Crago. |
| 2,556,479 | 6/1951 | McGrath. |
| 2,558,937 | 7/1951 | Dillman. |
| 3,159,208 | 12/1964 | Joesting _____ 236—80 X |
| 3,171,421 | 3/1965 | Joesting _____ 236—80 X |
| 3,324,891 | 6/1967 | Rhoades _____ 137—81.5 X |

EDWARD J. MICHAEL, Primary Examiner

U.S. Cl. X.R.

137—81.5; 236—80

UNITED STATES PATENT OFFICE
CERTIFICATE OF CORRECTION

Patent No. 3,478,960            November 18, 1969

Wesley L. Taylor

It is certified that error appears in the above identified patent and that said Letters Patent are hereby corrected as shown below:

Column 1, line 4, "Power" should read -- Powers --. Column 2, line 72, "38" should read -- 39 --. Column 3, line 47, "deail" should read -- detail --. Column 7, line 64, after "central" insert -- flow --.

Signed and sealed this 26th day of May 1970.

(SEAL)

Attest:

Edward M. Fletcher, Jr.

Attesting Officer

WILLIAM E. SCHUYLER, JR.

Commissioner of Patents